(12) United States Patent
Nucci et al.

(10) Patent No.: US 7,395,351 B1
(45) Date of Patent: Jul. 1, 2008

(54) METHOD FOR ASSIGNING LINK WEIGHTS IN A COMMUNICATIONS NETWORK

(75) Inventors: Antonio Nucci, Burlingame, CA (US); Bianca Schroeder, Pittsburgh, PA (US); Supratik Bhattacharyya, San Francisco, CA (US); Nina Taft, San Francisco, CA (US); Christophe Diot, Millbrae, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 931 days.

(21) Appl. No.: 10/352,425

(22) Filed: Jan. 28, 2003

(51) Int. Cl.
  *G06F 15/173* (2006.01)
  *H04L 12/26* (2006.01)
  *H04L 12/28* (2006.01)

(52) U.S. Cl. .............. 709/242; 709/239; 709/240; 709/241; 370/238; 370/351

(58) Field of Classification Search ........... 709/238, 709/239, 240, 241, 242; 370/238, 351
See application file for complete search history.

(56) References Cited

U.S. PATENT DOCUMENTS 6,633,544 B1 * 10/2003 Rexford et al. ............ 370/238

2003/0108052 A1 * 6/2003 Inoue et al. ................ 370/399

* cited by examiner

*Primary Examiner*—Jason D Cardone
*Assistant Examiner*—Tanim Hossain (57) ABSTRACT

The present invention includes a method and system for determining link weights that when utilized will optimize the performance of a network in the event of a link failure without the need to alter the link weights. The method includes determining two sets of links, one that includes links with a significant amount of loading and one that includes links with a modest amount of loading. A set of permissible solutions is generated utilizing one randomly chosen link from each set. After omitting recent best permissible solutions, the remaining permissible solutions are evaluated by analyzing for the complete network topology and for the topologies corresponding to all single-link failure states and the best permissible solution is found. If the best permissible solution is better than the current optimal solution, then the best permissible solution is made the optimal solution. These steps are repeated until a predetermined number of iterations have been evaluated without a change in the optimal solution. When that occurs, the number of links used to generate the set of potential solutions is randomly changed and the above-described steps are repeated. The method is complete after a second predetermined number of iterations have been evaluated no matter how many changes to the optimal solution.

36 Claims, 3 Drawing Sheets

METHOD FOR ASSIGNING LINK WEIGHTS IN A COMMUNICATIONS NETWORK

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

The present invention is directed to the field of network communications. More specifically, this invention is directed to a method for assigning link weights that allows a network to function effectively during a single-link failure without changing link weights.

The main function of a communications network is to transfer information from a source to a remote destination. Generally, a communications network includes a number of nodes (usually devices called routers) coupled together by a number of links. Typically there are a number of paths, or routes, made up of nodes and links for information to travel from a particular source to a particular destination. The process of determining the specific nodes and links to utilize so that the information will reach its destination in an efficient manner is called "routing" and is preformed by a routing protocol.

Proper routing decisions are critical to realizing optimal network performance. There are two main goals when making routing decisions: keeping end-to-end delays low and ensuring that no link is overloaded. Low end-to-end delays can be achieved by choosing short traffic routes so as to minimize propagation delays. Similarly, link overloading can be averted by minimizing the maximum link load thereby balancing the traffic load evenly across the network.

In general, a routing protocol operates by reading portions of a packet to determine the packet's destination and then passes that information to a routing algorithm that determines the best route for the packet. More specifically, after receiving a packet, a router will read the packet's header to determine the source, the destination and any pertinent metrics associated with the packet, and then send that information to a routing algorithm. The routing algorithm uses the information received, together with information obtained from one or more routing tables, to calculate the best path to send the packet to its intended target.

There are several types of information stored in routing tables. One type of information is addressing information that allows a routing protocol to identify and locate the destination for a packet. For example, a routing table may contain a list of addresses for every device in the network environment. Alternatively, a routing table may contain a list of the devices that are physically connected to the router along with those destinations that may be reached from those devices.

A second type of information that may be stored in a routing table relates to the environmental factors that may affect the transfer of data over a particular link. Generally, this information is reduced to a number that is referred to as a link weight. Although a link weight may represent any meaningful factor, it is generally indicative of the relative value of using one path over another to a specific destination. Depending on the configuration of a network, a particular link weight may represent the amount of bandwidth available on the link, the link's reliability, the traffic flow over the link, or the amount of money charged by the company that owns the link.

As stated above, a typical routing algorithm will perform a calculation to determine the best path to a particular destination. When Intra-domain routing relies on IGP link state protocols, such as IS-IS or OSPF, the traffic is routed between any two nodes along the minimum cost path measured as the sum of the weights of all links along the path. If multiple paths exist with the same minimum cost, the traffic demand is split equally among these paths.

Several methods are used to assign link weights. One common method involves setting the weight of the link inverse to its capacity so that a link with a high capacity will attract more traffic and a link with a low capacity will attract less traffic. Another method involves assigning link weights proportional to the physical length of the link in order to minimize propagation delays. Yet another method involves observing the flow of traffic through the network and repeatedly adjusting the link weights to accommodate the traffic.

A major drawback of the current approaches, generally, is that they view link weight assignment as a static problem and therefore largely ignore network dynamics. Specifically, one of the main challenges for a network operator is dealing with transient link failures. For example, when a link fails, IS-IS/OSPF protocols divert traffic from the failed link to alternate paths without computing new link weights. This action has the potential to overload one or more links, which could lead to even more failures absent some action by the network operator.

The most obvious way to restore network performance after a link failure is to implement a network-wide reassignment of link weights. Indeed, studies have shown that changing just a few link weights is usually sufficient to balance the traffic after a link failure. There are, however, problems with this approach. First, in order to be utilized, the new link weight assignments must be sent to every router in the network, and the routers must then recompute their minimum cost path to every other router. These actions may take a significant amount of time during which the network is subject to considerable instability. Second, it has been observed that most link failures are relatively short-lived. These short transient failures often leave operators and/or routers with insufficient time to evaluate and then reassign link weights. Also, if the link weights are reassigned, the operators and/or routers often must implement a second reassignment a short time later when the link is restored. Thus, in the event of a link failure, operators have the choice of simply suffering the instability while hoping that the link failure is resolved quickly or attempting to recompute and then reassign link weights. The problem with the first choice, obviously, is that the failure may not be resolved quickly. The problem with the second choice is that it requires significant work in a short amount of time which may need to be performed a second time only moments later.

Thus, it is desirable to provide a method for determining a set of link weights that balances traffic loads and keeps end-to-end delay low both in the absence of failures and in the case of a link failure. Implementing a set of link weights as determined by the present invention will allow a network to function well when there is a link failure without changing the link weight assignments. Additional advantages and novel features of the invention will be set forth in the description which follows, and in part will become apparent to those skilled in the art upon examination of the following, or may be learned from practice of the invention.

BRIEF SUMMARY OF THE INVENTION

The present invention solves at least the above problems by providing a system and method for optimizing the performance of a communications network by determining a set of link weights that will allow the network to function effectively when there is a link failure without changing link weight assignments.

In one aspect of the invention, a method for determining link weights that when utilized will optimize the performance of a network in the event of a link failure without the need to alter the link weights is provided. First, a set of admissible routes is determined by filtering from the set of all possible routes for the network those routes with characteristics that fall below a predetermined threshold. For example, in one embodiment of the invention, the threshold is a hop count, so that the admissible routes are those routes with a hop count less than the threshold. Only the admissible routes are considered in the remaining steps of the method. Next, an initial set of link weights (also called a solution) is evaluated by routing all traffic along the minimum cost shortest paths in order to identify a set of heavily-loaded links and a set of lightly-loaded links. One link from the set of heavily-loaded links and one link from the set of lightly-loaded links are then randomly chosen, and the link weights of these randomly chosen links are varied to generate a set of permissible solutions, which, after omitting certain recent solutions, are evaluated to determine the best permissible solution. This evaluation includes analyzing not only the complete network topology but also the topologies corresponding to all single-link failure states. After the best permissible solution is saved, it is compared to the current optimal solution. If the best permissible solution is better than the current optimal solution, then the best permissible solution is made the optimal solution. Thereafter, the method returns to the step of selecting links to evaluate. The method repeats until a predetermined number of solutions have been evaluated without a change in the optimal solution. When that occurs, the number of links used to generate the set of permissible solutions is randomly changed, and the method once again returns to the step of selecting links to evaluate. The method is complete after a second predetermined number of solutions have been evaluated no matter how many changes to the optimal solution.

In another aspect of the invention, a system for determining link weights that when utilized will optimize the performance of a network in the event of a link failure without the need to alter the link weights is provided. The system includes a processing component that is coupled to a counter component, a random number generator, an evaluation component, and a memory component. The processing component is operable to generate admissible routes, permissible solutions, and sets of heavily- and lightly-loaded links. The counter component is operable to maintain several counts related to the number of solutions considered. The random number generator is operable to provide a random number on demand. The evaluation component is operable to evaluate one or more solutions and to provide the results to the processing component, which is further operable to utilize the results from the evaluation component to compare solutions. Finally, the memory component is operable to store solutions and a number of other variables.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

The present invention provides a method and a system for optimizing the performance of a communications network by determining a single set of link weights that make a network robust to single-link failures. By utilizing the link weights determined by the present invention, a network can function well when there is a link failure without changing link weight assignments.

Figure 1:
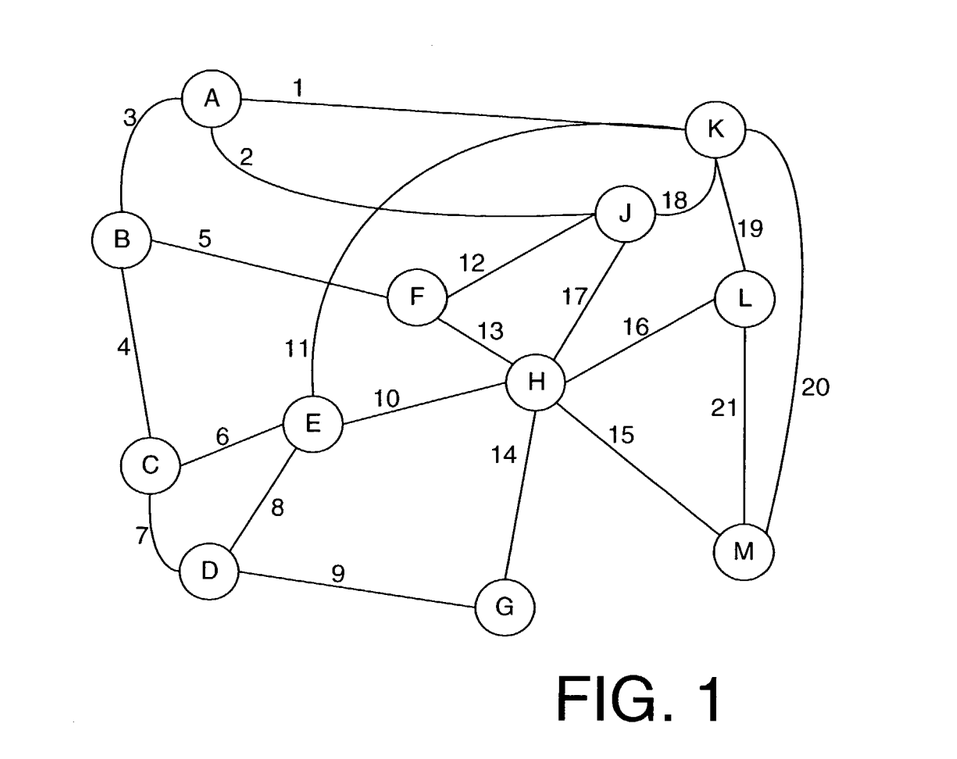
FIG. 1 is a topological representation of a network showing the network nodes and links.

In FIG. 1, the topology of a communication network is shown. As is understood in the field, a communication network generally includes a number of routers (represented by circles containing the letters A through M) connected by a number of links (represented by lines referred to by the numerals 1 through 20). It should be understood that the term "link" includes, but is not limited to, wired media, such as cable, and wireless media, such as acoustic, infrared, radio, microwave, spread-spectrum, and other wireless media technologies.

The purpose of a communication network is to transfer data from one place to another. For example, a first person using a first computer coupled to router A may want to send a file to a second person using a second computer coupled to router M. After it enters the network at router A, the file may travel through a number of different links and routers before arriving at router M. One route may include traveling from router A across link 1 to router K and then across link 20 to router M. A second route may include traveling from router A across link 2 to router J, then across link 17 to router H, and finally across link 15 to router M.

Generally, each router in the communication network maintains information in one or more routing tables concerning the address of other routers and devices in the network and the weights assigned to the links in the network. Thus, using the above example, when router A receives the file intended for the second computer, it may consult its routing table to determine that the second computer is connected to router M. The router will then either determine the possible routes to router M or read these routes from a routing table. Assuming that the router is relying on an IGP link state protocol, the router will then calculate the sum of the link weights for each route and choose as the best route the one with the lowest total link weight or cost. Continuing with the above example, if the first route has been selected as the best route for data to travel from router A to router M, then router A will place the file on link 1. When router K receives the information, it will also consult its routing tables to determine where to place the file, and thereafter will place the file on link 20. It should be understood that a router may compute its best routes on a periodic basis and store those routes in a table so that when a packet arrives the router simply has to compare the packet's destination to a table entry to determine the appropriate link for the packet.

A link state routing protocol may take several steps to determine the best route between two routers. First, the routing protocol may read the link weights in a routing table. It should be understood that many different link weights may be employed and that this invention is intended to encompass all such link weights. For ease of discussion, it will be assumed that the integers 1 through 5 are appropriate link weights. Thus, continuing with the above example, a link weight of 2 may be assigned to links 1 and 20, a link weight of 3 may be assigned to links 2 and 17, and a link weight of 4 may be assigned to link 15. (As stated above, link weights may be assigned based on the capacity of the links, the end-to-end propagation of the link, or some other factor.) Thereafter, the routing protocol finds the cost of each possible route between the routers by adding the weight of each link in the route. Continuing with the above example, the routing protocol will calculate a cost of 4 for the first route (from router A to router K to router M) and a cost of 10 for the second route (from router A to router J to router H and finally to router M). Because the cost of the first route is lower than the cost of the second route, the first route is selected.

Figure 2A:
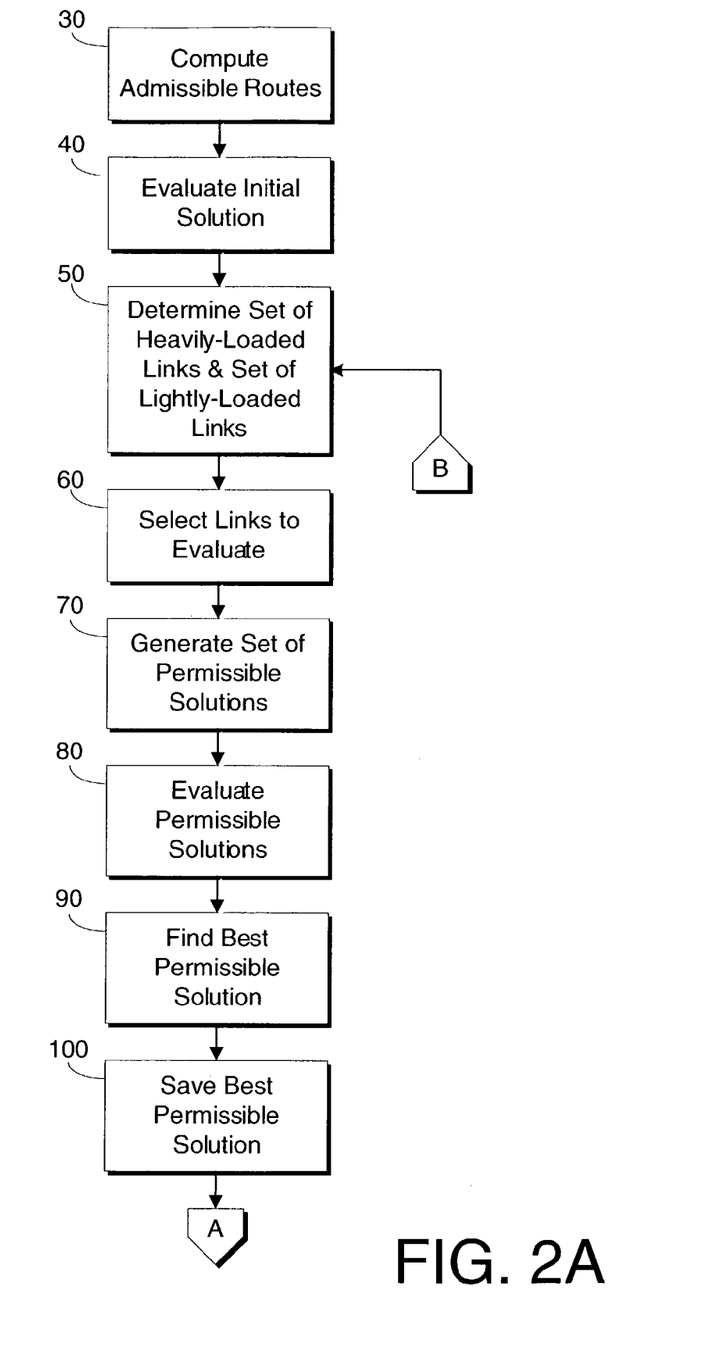
FIG. 2A is a flowchart illustrating a method for optimizing the performance of a communications network according to one embodiment of the present invention.
Figure 2B:
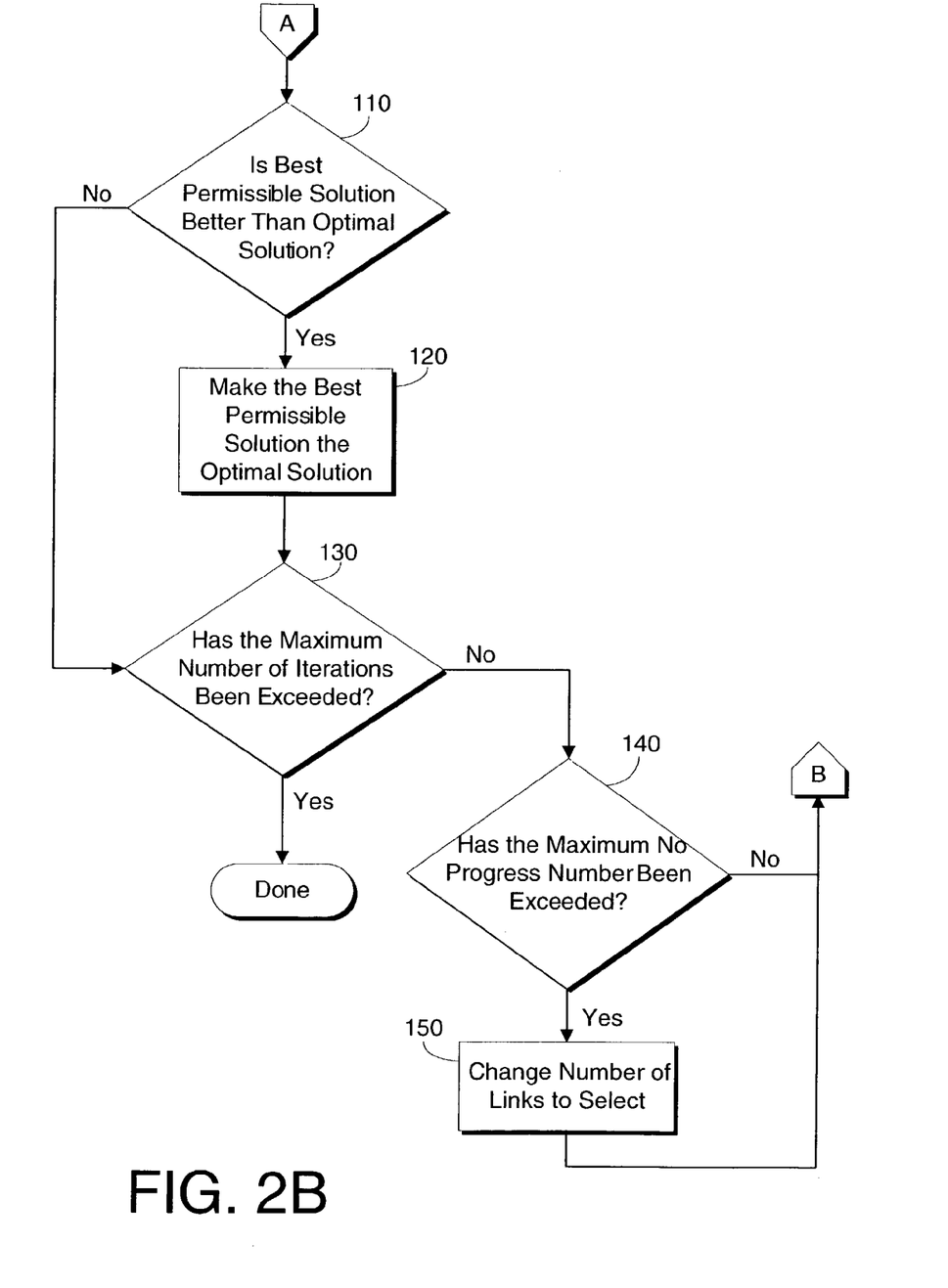
FIG. 2B is a continuation of the flowchart begun in FIG. 2A.

In one embodiment, the present invention is a method shown in FIGS. 2A and 2B. It should be understood that when the method is undertaken the topology of the network is known as is the traffic demand between routers (sometimes referred to a traffic matrix). Also, prior to undertaking the method, an initial solution or set of link weights are assigned. This initial solution may represent the "best guess" of the network operator or administrator and/or may be the solution currently in use on the network.

The method begins at step 30 in FIG. 2A where the admissible routes for each network state are determined. Generally, an admissible route is a route which information can follow from one router to another that meets certain criteria. In a preferred embodiment of the present invention, the phrase "admissible route" refers to a route that has less than a specified number of hops. An admissible route may also be determined by the capacity or the transmission speed of the links and/or the end-to-end propagation delay, among other factors. The admissible routes are determined both in the absence of link failures and for each single-link failure state. In a preferred embodiment, when determining the admissible routes for a reduced network, i.e. a network with a single-link failure, only those admissible routes from the complete network that are affected by the failure are changed.

Next, at step 40, the initial solution is evaluated. A solution is evaluated by computing the minimum cost path between every source-destination pair in the network from the set of admissible routes and placing all traffic demands along these paths. In this manner the load on every link is determined.

The method continues at step 50 where a set of heavily-loaded links and a set of lightly-loaded links are determined. To determine whether a link is heavily or lightly loaded, the maximum and minimum links loads found in step 40 are used. In a preferred embodiment, the set of heavily-loaded links is defined as those links with a load greater than or equal to 60% of the maximum link load and the set of lightly-loaded links is defined as those links with a load less than or equal to 40% of the minimum link load.

At step 60, one link from each set of links found in step 50 is randomly chosen, and, at step 70, these randomly chosen links are used to generate a set of permissible solutions. To generate a set of permissible solutions, the link weight of the chosen links is varied. In one embodiment of the present invention, the link weight are varied over the entire range of allowable link weights. Thus, for the case when a link weight may range from one to five, the number of permissible solutions equals 25. In another preferred embodiment, the link weight of the link from the set of heavily-loaded links is increased in order to divert traffic from this link while the link weight of the link from the set of lightly-loaded links is decreased in order to attract more traffic to this link.

Importantly, when the permissible solutions are determined, certain solutions are excluded so that the method will avoid cycling among the same set of solutions. Specifically, a number of the previous best permissible solutions are excluded. In a preferred embodiment of the present invention, the exclusion of previous best permissible solutions is accomplished by utilizing a Static Tabu list that contains most recent moves between the best permissible solutions and the optimal solutions composed by the links whose weights were changed and the increasing/decreasing weight perturbation applied. The choice of size for the Tabu list is also important because too small a size could cause cyclic repetition between solutions and too large a size may severely limit the number of applicable moves. In a preferred embodiment of the present invention the size of the Static Tabu list is eight.

In step 80, each remaining permissible solution is evaluated. As in step 40, a solution is evaluated by computing the minimum cost path between every source-destination pair in the network from the set of admissible routes and placing all traffic demands along these paths. In this manner the load on every link is determined. Notably, in this step each solution is evaluated not only for the complete topology but also for each reduced topology corresponding to every single-link failure state.

In step 90, the best permissible solution is found. In one embodiment of the present invention, the best permissible solution is defined as the solution which results in the lowest maximum link load in any given network state. This embodiment corresponds to the policy decision where maximum consideration is given to the performance of the network when a link fails. Alternatively, in another embodiment of the present invention, the best permissible solution is defined as the solution which results in the lowest maximum link load for the complete topology. As should be understood, the best permissible solution may be defined so that both the lowest maximum link load in any given network state and lowest maximum link load for the complete topology are taken into consideration. In addition, it should also be understood that other factors may be used to determine the best permissible solution, such as the average link load and/or the distribution of the loads.

In step 100, the best permissible solution is saved for comparison to later sets of permissible solutions. As stated before, in a preferred embodiment, the best permissible solution is saved in a Static Tabu list.

Continuing with FIG. 2B, at step 110 it is determined whether the best permissible solution is better than the current optimal solution. It should be understood that in the first iteration of this method, the initial solution is defined as the optimal solution. To determine whether one solution is better than another, generally, the factors utilized in step 90 are compared. Thus, in one embodiment of the present invention, when two solutions are compared, the better solution is the solution with the lowest maximum link load.

If the best permissible solution is better than the current optimal solution, then the method continues at step 120 where the best permissible solution becomes the current optimal solution. Thereafter, the method continues with step 130. If at step 100 it is determined that the best permissible solution is not better than the current optimal solution, then the method skips step 120, and continues at step 130.

At step 130, it is determined whether the maximum number of iterations of the method have been completed. As will be understood by those in the art, a count of the total number of iterations completed will be kept and increased each time the method completes its steps. In one embodiment, this count is initially set to zero in step 30 and then incremented in step 100. The maximum number of iterations considered will depend on the size of the network being studied, the amount of computational time allowed, and the quality of the final solution desired. In one embodiment of the present invention, the maximum number of iterations that will be completed is 10,000.

If, at step 130, it is determined that the maximum number of iterations have been completed, then the method is concluded and the current optimal solution is the final solution. However, if it is determined that the maximum number of iterations have not been executed then the method continues at step 140.

At step 140, it is determined whether the method is making improvements to the optimal solution under its current constraints. To make this determination, the number of iterations that have been completed without changing the optimal solution is compared to a maximum no progress number. As will be understood by those in the art, if the permissible solutions do not yield a solution better than the current optimal solution (that is, if the answer at step 110 is No) then a count of the number of iterations completed without changing the current optimal solution is increased. Alternatively, if the question posed in step 110 is answered positively, then the count will be set to zero. In addition, the count will be set to zero each time the question posed in step 140 is answered positively.

At step 140, this second count is compared to the maximum no progress number and if the count does not exceed the maximum no progress number then the method continues at step 50 in FIG. 2A. If, however, the count does exceed the maximum no progress number then the method will continue at step 150 where the number of links that are to be chosen from the set of heavily-loaded links and from the set of lightly-loaded links is randomly changed. This new number of links will thereafter be utilized throughout the method until changed again. In one embodiment of the present invention, the maximum number of iterations that may be executed without changing the optimal solution is set to 100. Finally, as shown in FIGS. 2A and 2B, following step 150 the method continues at step 50.

Figure 3:
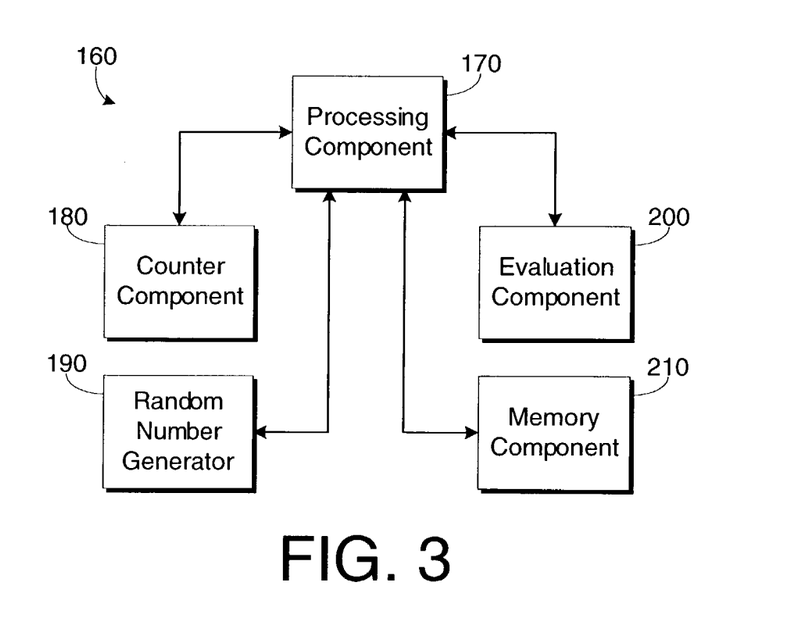
FIG. 3 is a block diagram illustrating a system that is operable to provide a set of links weights that optimize the performance of a communications network according to one embodiment of the present invention.

In another aspect of the invention, a system for determining link weights that will optimize the performance of a communications network is provided. Referring now to FIG. 3, the system, generally referred to by the numeral 160, includes a processing component 170 that is coupled to a counter component 180, a random number generator 190, an evaluation component 200, and a memory component 210.

In operation, a number of variables including the topology of the network, a traffic matrix, a threshold value for determining admissible routes, a maximum number of iterations, a maximum no progress number, boundaries for the heavily- and lightly-loaded link sets, a number of links to evaluate (which is set initially to one), the range of link weights, evaluation criteria, and an initial solution are provided to system 160. Once received, these variables may be stored in memory component 210 or may be stored in the components that utilize these variables. For example, the maximum number of iterations and the maximum no progress number may be stored in counter component 180. Also, a first count and a second count, which are kept in counter component 180, are set to zero After the above referenced information is received and stored, processing component 170 utilizes the network topology and the threshold value to determine the admissible routes for the complete network and for every single-link failure state in the network. Thereafter, processing unit 170 instructs evaluation component 200 to evaluate the initial solution. Upon receiving this instruction, evaluation component 200 utilizes the admissible routes and the traffic matrix to evaluate the initial solution. Generally, this evaluation will consist of placing all traffic demands across the minimum cost shortest paths. Processing component 170 receives the results from evaluation unit 200 and utilizes those results with the boundaries for the heavily- and lightly-loaded link sets to find those sets which it then stores, for example, in memory component 210.

Next, processing component 170 requests from random number generator 190 a first random number in the range between one and the number of links in the heavily-loaded link set (inclusive) and a second random number in the range between one and the number of links in the lightly-loaded link set (inclusive). Processing component 170 performs this operation a number of times that is equal to the number of links to evaluate.

Processing component 170 then chooses from the set of heavily-loaded links the link that corresponds to the first random number and from the set of lightly-loaded links the link that correspond to the second random number. Processing component 170 then varies the weights of the chosen links to determines the permissible solutions. Next, processing component 170 removes from the permissible solutions certain previous best permissible solutions which are saved in memory component 210.

Processing component 170 then instructs evaluation component 200 to evaluate the remaining permissible solutions utilizing both the complete topology and every single-link failure state for the network. Upon receiving this instruction, evaluation component 200 again utilizes the appropriate admissible routes and the traffic matrix to evaluate the permissible solutions and provides its results to processing component 170. Processing component 170 receives the results from evaluation component 200, finds the best permissible solution based on the evaluation criteria, and send that solution to memory component 210 to be saved. Processing component 170 also instructs counter component to increment the first count. Processing component 170 then compares the best permissible solution to the current optimal solution stored in memory component 210. If the best permissible solution is better then the current optimal solution, according to the evaluation criteria, processing component 170 instructs memory component 210 to store the best permissible solution and denominate it the optimal solution. Processing component 170 also instructs counter component 180 to set its second count to zero. If the best permissible solution is not better than the current optimal solution, then processing component 170 instructs counter component to increment the second count.

At this time, counter component 180 compares its first count with the maximum number of iterations and its second count with the maximum no progress number. Counter component 180 then informs processing unit 170 if the first count or the second count exceed the numbers to which they are compared.

After determining whether the best permissible solution is better then the current solution, processing unit 170 checks first if counter component 180 has found that its first count exceeds the maximum number of iterations. If this is true, the processing unit indicates that it has a final solution. Otherwise, processing component 170 checks if counter component 180 has found that its second count exceeds the maximum no progress number. If this is true, processing component requests a random number between one and the number of links in the heavily-loaded set from random number generator 190 and makes this the number of heavily-loaded links to evaluate. Processing component 170 then requests a random number between one and the number of links in the lightly-loaded set from random number generator 190 and makes this the number of lightly-loaded links to evaluate. Finally, processing component 170 instructs counter component 180 to set its second count to zero. Thereafter, processing unit 170 proceeds to repeat the above-described operation with the new variables and optimal solution.

As one skilled in the art will appreciate, the present invention may also be embodied as a computer-program product that includes computer-useable instructions embodied on a computer-readable medium. Computer-readable media contemplates media readable by a database, a switch, and various other network devices and may comprise computer-storage media and communications media. Computer-storage media include media implemented in any method or technology for storing information including, but are not limited to: RAM, ROM, EEPROM, flash memory or other memory technology, CD-ROM, Digital Versatile Disks (DVD), holographic media or other optical disk storage, magnetic cassettes, magnetic tape, magnetic disk storage, and other magnetic storage devices. Communications media typically embody computer-useable instructions—including data structures and program modules—in a modulated data signal. By way of example, but not limitation, communication media include wired media, such as a wired network or direct-wired connection, and wireless media such as acoustic, infrared, radio, microwave, spread-spectrum, and other wireless media technologies. Combinations of the above are included within the scope of computer-readable media.

The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and within the scope of the claims.

What is claimed is:

1. A method for determining link weights that when utilized will optimize the performance of a network in the event of a link failure without the need to alter the link weights, said network including a plurality of nodes connected by a plurality of links, said network operable to transfer information from a first node to a second node over one or more of said links wherein the one or more links utilized to transfer said information constitute a route, said route determined by a weight that is assigned to each link, said set of link weights being a solution, said method comprising the following steps:
   (a) receiving an initial solution;
   (b) making said initial solution the current optimal solution;
   (c) computing one or more admissible routes between the plurality of nodes;
   (d) evaluating the initial solution utilizing both a full network and every single-link failure state;
   (e) determining a set of heavily-loaded links and a set of lightly-loaded links;
   (f) selecting randomly one link from said set of heavily-loaded links and one link from said set of lightly-loaded links;
   (g) generating a set of permissible solutions from the randomly selected links, said set of permissible solutions excluding previous best permissible solutions;
   (h) evaluating each permissible solution utilizing both the full network and every single-link failure state;
   (i) determining the best permissible solution;
   (j) comparing the best permissible solution to the current optimal solution;
   (k) if the best permissible solution is better than the current optimal solution then making the best permissible solution the next current optimal solution;
   (l) if a first maximum number of iterations has been evaluated, then making at least one of the current optimal solution and the next current optimal solution the final solution;
   (m) if a second maximum number of iterations has been evaluated without making a change to at least one of the current optimal solution and the next current optimal solution, then randomly obtaining a new number of links to evaluate; and
   (n) repeating steps (f) through (n) utilizing the new number of links to evaluate until the first maximum number of iterations has been evaluated.

2. The method of claim 1 wherein the one or more admissible routes are those routes that do not exceed a fixed threshold.

3. The method of claim 2 wherein the fixed threshold is a number of hops.

4. The method of claim 2 wherein the fixed threshold is an end-to-end propagation delay.

5. The method of claim 1 wherein said evaluating steps include computing the minimum cost path between every pair of nodes in the network from the one or more admissible routes and placing all traffic demands along these paths.

6. The method of claim 1 wherein the best permissible solution is defined as a solution which results in a lowest maximum link load in any given network state.

7. The method of claim 1 wherein the best permissible solution is defined as a solution which results in a lowest maximum link load for a complete topology.

8. The method of claim 1 wherein the best permissible solution is defined as a solution which results in a lowest average link load.

9. The method of claim 1 wherein the best permissible solution is defined as a solution which results in a smallest deviation in a distribution of link loads.

10. The method of claim 1 wherein the best permissible solution is better than the current optimal solution if it has a lower maximum link load in any given network state.

11. The method of claim 1 wherein the best permissible solution is better than the current optimal solution if it has a lower maximum link load for a complete topology.

12. The method of claim 1 wherein the best permissible solution is better than the current optimal solution if it has a lower average link load.

13. The method of claim 1 wherein the best permissible solution is better than the current optimal solution if it has a smallest deviation in a distribution of link loads.

14. The method of claim 1 wherein step (i) further includes storing the best permissible solution.

15. The method of claim 14 wherein storing the best permissible solution includes storing a move from the current optimal solution to the best permissible solution in a Static Tabu table.

16. The method of claim 15 wherein the Static Tabu table has a size of eight.

17. The method of claim 1 wherein the first maximum number of iterations is 10,000.

18. The method of claim 1 wherein the second maximum number of iterations is 100.

19. One or more computer-storage media having a tangible component containing computer-useable instructions embodied thereon for causing a computer to perform a method for determining link weights that when utilized will optimize the performance of a network in the event of a link failure without the need to alter the link weights, said network including a plurality of nodes connected by a plurality of links, said network operable to transfer information from a first node to a second node over one or more of said links wherein the one or more links utilized to transfer said information constitute a route, said route determined by a weight that is assigned to each link, said set of link weights being a solution, the method comprising the steps of:
(a) receiving an initial solution;
(b) making said initial solution the current optimal solution;
(c) computing one or more admissible routes between the plurality of nodes;
(d) evaluating the initial solution utilizing both a full network and every single-link failure state;
(e) determining a set of heavily-loaded links and a set of lightly-loaded links;
(f) selecting randomly one link from said set of heavily-loaded links and one link from said set of lightly-loaded links;
(g) generating a set of permissible solutions from the randomly selected links, said set of permissible solutions excluding previous best permissible solutions;
(h) evaluating each permissible solution utilizing both the full network and every single-link failure state;
(i) determining the best permissible solution;
(j) comparing the best permissible solution to the current optimal solution;
(k) if the best permissible solution is better than the current optimal solution then making the best permissible solution the next current optimal solution;
(l) if a first maximum number of iterations has been evaluated, then making at least one of the current optimal solution and the next current optimal solution the final solution;
(m) if a second maximum number of iterations has been evaluated without making a change to at least one of the current optimal solution and the next current optimal solution, then randomly obtaining a new number of links to evaluate; and (n) repeating steps (f) through (n) utilizing the new number of links to evaluate until the first maximum number of iterations has been evaluated.

20. The computer-storage media of claim 19 wherein the one or more admissible routes are those routes that do not exceed a fixed threshold.

21. The computer-storage media of claim 20 wherein the fixed threshold is a number of hops.

22. The computer-storage media of claim 20 wherein the fixed threshold an end-to-end propagation delay.

23. The computer-storage media of claim 19 wherein said evaluating steps include computing the minimum cost path between every pair of nodes in the network from the one or more admissible routes and placing all traffic demands along these paths.

24. The computer-storage media of claim 19 wherein the best permissible solution is defined as a solution which results in a lowest maximum link load in any given network state.

25. The computer-storage media of claim 19 wherein the best permissible solution is defined as a solution which results in a lowest maximum link load for a complete topology.

26. The computer-storage media of claim 19 wherein the best permissible solution is defined as a solution which results in a lowest average link load.

27. The computer-storage media of claim 19 wherein the best permissible solution is defined as a solution which results in a smallest deviation in a distribution of link loads.

28. The computer-storage media of claim 19 wherein the best permissible solution is better than the current optimal solution if it has a lower maximum link load in any given network state.

29. The computer-storage media of claim 19 wherein the best permissible solution is better than the current optimal solution if it has a lower maximum link load for a complete topology.

30. The computer-storage media of claim 19 wherein the best permissible solution is better than the current optimal solution if it has a lower average link load.

31. The computer-storage media of claim 19 wherein the best permissible solution is better than the current optimal solution if it has a smallest deviation in a distribution of link loads.

32. The computer-storage media of claim 19 wherein step (i) further includes storing the best permissible solution.

33. The computer-storage media of claim 32 wherein storing the best permissible solution includes storing a move from the current optimal solution to the best permissible solution in a Static Tabu table.

34. The computer-storage media of claim 33 wherein the Static Tabu table has a size of eight.

35. The computer-storage media of claim 19 wherein the first maximum number of iterations is 10,000.

36. The computer-storage media of claim 19 wherein the second maximum number of iterations is 100.

* * * * *

UNITED STATES PATENT AND TRADEMARK OFFICE
CERTIFICATE OF CORRECTION

| | |
|---|---|
| PATENT NO. | : 7,395,351 B1 |
| APPLICATION NO. | : 10/352425 |
| DATED | : July 1, 2008 |
| INVENTOR(S) | : Nucci et al. |

It is certified that error appears in the above-identified patent and that said Letters Patent is hereby corrected as shown below:

Please correct the Assignee: "Sprint Spectrum L.P. (Overland Park, KS)"; to the following Assignee: -- Sprint Communications Company L.P., Overland Park, KS (US) --

Signed and Sealed this

Tenth Day of November, 2009

David J. Kappos
*Director of the United States Patent and Trademark Office*